United States Patent [19]

Chelminski

[11] Patent Number: 4,599,712

[45] Date of Patent: Jul. 8, 1986

[54] MODULAR AIRGUN ARRAY METHOD, APPARATUS AND SYSTEM

[75] Inventor: Stephen V. Chelminski, West Redding, Conn.

[73] Assignee: Bolt Technology Corporation, Norwalk, Conn.

[21] Appl. No.: 475,542

[22] Filed: Mar. 15, 1983

[51] Int. Cl.[4] .......................... H04R 1/02; G01V 1/06

[52] U.S. Cl. ...................................... 367/144; 181/118

[58] Field of Search ............... 181/107, 111, 115, 117, 181/118, 119, 120; 367/56, 143, 144, 153, 154, 177, 172

[56] References Cited

U.S. PATENT DOCUMENTS

| | | | |
|---|---|---|---|
| 3,249,177 | 5/1966 | Chelminski | 181/118 |
| 3,379,273 | 4/1968 | Chelminski | 181/118 |
| 3,653,460 | 4/1972 | Chelminski | 181/120 |
| 4,034,827 | 7/1977 | Leerskov et al. | 181/107 |
| 4,038,630 | 7/1977 | Chelminski | 181/110 |
| 4,047,591 | 9/1977 | Ward et al. | 181/107 |
| 4,072,923 | 2/1978 | Seims et al. | 367/6 |
| 4,210,222 | 7/1980 | Chelminski et al. | 181/107 |
| 4,234,052 | 11/1980 | Chelminski | 181/111 |
| 4,240,518 | 12/1980 | Chelminski | 181/107 |
| 4,286,687 | 9/1981 | Fiske, Jr. | 181/119 |
| 4,301,887 | 11/1981 | Fiske, Jr. | 181/107 |
| 4,464,739 | 8/1984 | Moorcraft | 367/20 X |

*Primary Examiner*—Charles T. Jordan
*Assistant Examiner*—Brian Scott Steinberger
*Attorney, Agent, or Firm*—Parmelee, Bollinger & Bramblett

[57] ABSTRACT

A plurality of control station, watertight, submerged junction boxes are towed at spaced positions located along an airgun array, each junction box for including a microprocessor and data storage transmission capability, and airgun firing circuits to control predetermined airguns. The electrical cable for the array and the air supply lines, as well as the airguns to be controlled, are detachably coupled to respective junction boxes. Thus, the number of airguns in the towed array can be changed quickly and conveniently by coupling or uncoupling junction boxes and the associated airguns. A protective hose sheath extends between successive junction boxes and this hose sheath contains power lines and a communication bus, detachably connected to terminals in successive junction boxes. This hose sheath and interiors of junction boxes are pressurized with low pressure air during towing for excluding water in the event of a leak. When this array is on shipboard in sunshine the junction boxes are cooled by increasing pressure of low pressure air until a relief valve at the far end of the array opens establishing continuous flow of low pressure air travelling in series through protective hose sheath sections and through the junction boxes. The hose sheath and high pressure air supply line are each assembled in detachable sections extending between successive junction boxes. There is a short by-pass pipe for high pressure air attached to each junction box, and each airgun feed line is tapped into a respective one of these by-pass pipes.

18 Claims, 14 Drawing Figures

TOWING CABLE
HIGH PRESSURE AIR LINE
LOW PRESSURE PROTECTIVE HOSE
FIRING LINE
MONITOR LINE
AIR LINE
TOWING DIRECTION
LOW PRESSURE PROTECTIVE HOSE SHEATH
ON SHIPBOARD
PRESSURE REGULATOR
AIR DRYER AND FILTER
LOW PRESSURE AIR SUPPLY
HIGH PRESSURE AIR SUPPLY

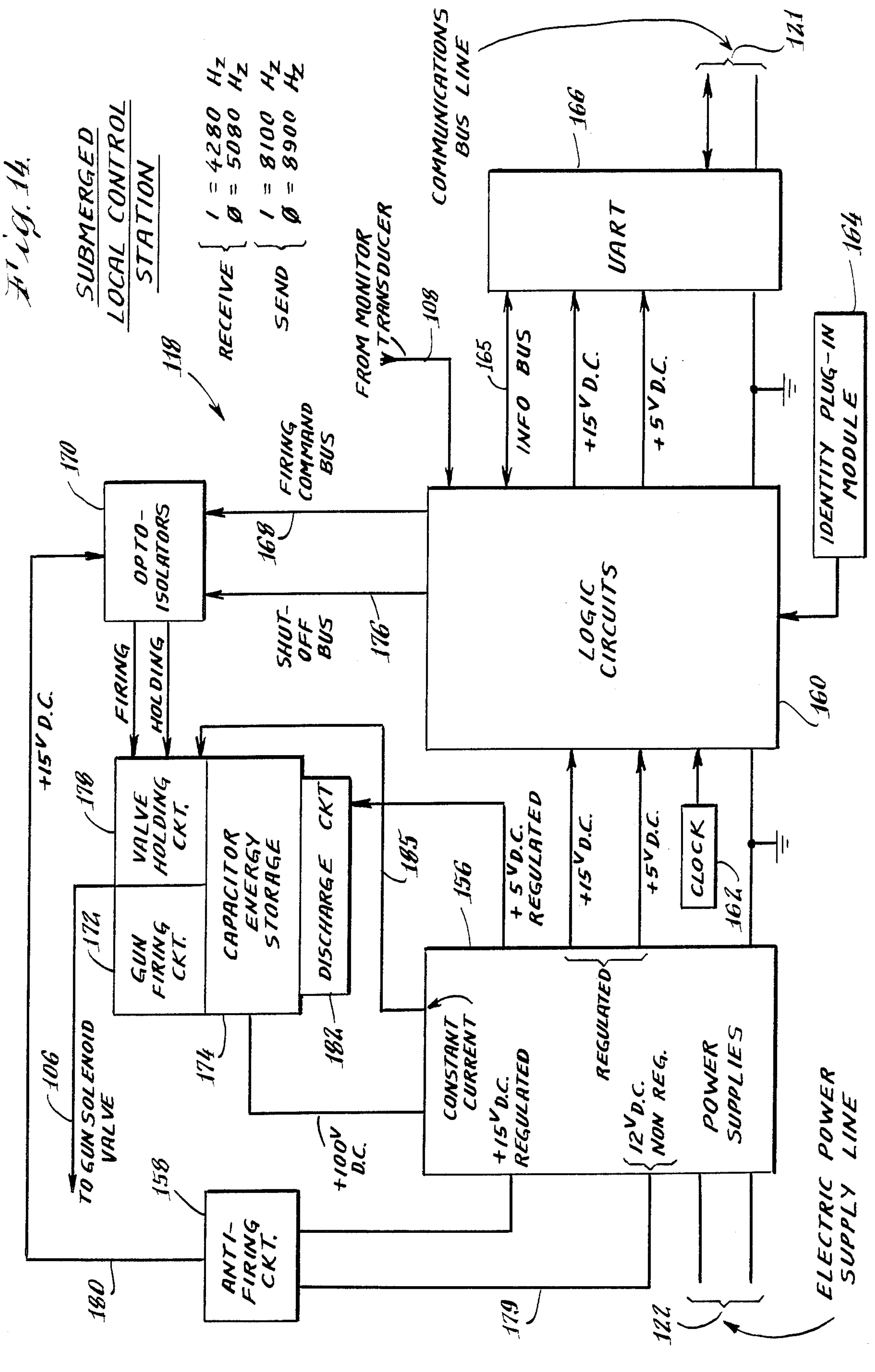
Fig. 14.
SUBMERGED LOCAL CONTROL STATION
RECEIVE { 1 = 4280 Hz, Ø = 5080 Hz
SEND { 1 = 8100 Hz, Ø = 8900 Hz
118
COMMUNICATIONS BUS LINE
121
166
UART
FROM MONITOR TRANSDUCER
108
165
INFO BUS
+15V D.C.
+5V D.C.
IDENTITY PLUG-IN MODULE
164
170
OPTO-ISOLATORS
FIRING COMMAND BUS
168
SHUT-OFF BUS
176
LOGIC CIRCUITS
160
FIRING
HOLDING
+15V D.C.
178
VALVE HOLDING CKT.
GUN FIRING CKT.
172
CAPACITOR ENERGY STORAGE
DISCHARGE CKT
185
156
+ 5V D.C. REGULATED
+15V D.C.
+5V D.C.
CLOCK
162
174
182
CONSTANT CURRENT
+15V D.C. REGULATED
REGULATED
12V D.C. NON REG.
POWER SUPPLIES
106
TO GUN SOLENOID VALVE
+100V D.C.
158
ANTI-FIRING CKT.
180
179
122
ELECTRIC POWER SUPPLY LINE

MODULAR AIRGUN ARRAY METHOD, APPARATUS AND SYSTEM

FIELD OF THE INVENTION

This invention relates to the field of marine seismic surveying utilizing an array of airguns and more particularly, to methods and appratus for more effectively and conveniently employing a plurality of airguns and towing them in a long array from a surveying vessel in which the guns are controlled by and communications to and from the guns are carried out via a plurality of spaced, submerged, internally pressurized junction boxes each containing microprocessor means and associated electronics, such junction boxes being stationed at spaced locations along the array.

BACKGROUND OF THE INVENTION

Marine airguns and seismic surveying methods associated with marine airguns are described in U.S. Pat. Nos. 3,249,177; 3,379,273; 3,653,460 and 4,038,630 which are assigned to the present assignee and to which the reader may refer for background information. With continual and increased emphasis on off-shore exploration, as well as the escalating costs of drilling in bodies of water, better yielding and more accurate seismic information with respect to the formations below the body of water are required. An array of airguns towed behind a survey vessel acts as an antenna array to transmit seismic energy with desired characteristics in controlled directions relative to the array. However, there is a limit to the number of airguns which may be towed due to the unwieldy size and towing drag, stresses and reliability and maintenance problems caused by the umbilical cable conventionally required. Each airgun requires two electrical leads connected to its solenoid valve for firing the airgun as well as two leads to the monitor sensor electrical transducer for detecting the instant of firing of the associated airgun plus the high pressure air feed line.

As more airguns are added, the umbilical cable extending from the ship gets larger and larger until the point where it becomes unmanageable. Also, the large diameter umbilical cable creates a great amount of frictional, turbulent and vibrational "drag" from the water as it is being towed behind a ship. Such large effect drag induces considerable stress on the umbilical cable and its components leading to premature failures. Such large drag effect causes the ship itself to consume more fuel than would occur at a more moderate level.

Furthermore, with such a large bundle of air lines and wires in one umbilical cable, it is difficult to locate electrical or pneumatic faults and difficult to test and repair, involving slicing into the cable, separating and repairing the faulty component, reassembling, and then repairing the incision with time-consuming surgical-like complexities and procedures. Moreover, once a given umbilical cable has been assembled, it is difficult to add further airguns to that particular array. There is very little adaptability in an umbilical-type array.

SUMMARY OF THE INVENTION

Accordingly, it is the object of this invention to provide a new modular method, apparatus and system for the use and control of airguns in a marine seismic surveying array and for enabling multiple airguns to be more easily handled and controlled than in prior systems.

A further object of this invention is to provide a new modular method, apparatus and system for simultaneously towing and handling multiple airguns for use in marine seismic surveying which permits airguns to be added or removed at will and facilitates the unreeling, towing and reeling of such airgun arrays.

A further object of this invention is to provide a new modular method, apparatus and system for simultaneously towing and handling a plurality of marine seismic survey airguns which is more efficient by eliminating the large diameter umbilical cable and by reducing the towing "drag" for a given number of airguns in a towed array.

Among the advantages provided by the present invention are those arising from the fact that in a modular array embodying this invention it is easier to test, repair, and replace components than in prior airgun arrays.

An advantageous modular system is provided for enabling as many airguns to be added as may be desired, within reason, for example, up to one hundred, or even more, airguns in a single towed array. By utilizing the modular system with the airguns being connected to and controlled by the respective junction boxes, if any malfunction occurs, detection, testing and correction are facilitated, with the malfunctioning components being readily removable and replaceable.

It is among the advantages of the illustrative embodiments of the invention described that the junction boxes and the protective hose sheath containing the electrical power supply lines and containing the communication bus lines to the respective junction boxes are pressurized with low pressure air for excluding water in the event of a leak, for example, at a low pressure of approximately 20 to 30 p.s.i. above atmospheric pressure. At the far end of the modular array is a pressure-relief valve set at a slightly higher pressure, for example, at a pressure level of approximately 25 to 35 p.s.i. above atmosphere. Thus, advantageously, while the modular array is lying on shipboard in the sunshine, all of the electrical, microprocessor and electronic components therein can be automatically cooled by conveniently increasing the pressure of this low pressure air until this relief valve opens. Thus, there is established a continuous cooling flow of low pressure air travelling through the protective hose sheath and through all of the junction boxes. When this modular array is placed in the water it is no longer necessary to air-cool the electrical and electronic components, and so the low pressure air level is reduced to its normal operating value which permits the relief valve to close.

Among the further advantages of this invention are those resulting from the fact that it enables a dramatic reduction to be achieved in the number of wires required for individually controlling and monitoring the operation of each of the airguns. Electronic logic and control functions, for firing the individual airguns each at the desired instant for optimizing characteristics and wavefront of the seismic energy impulses being transmitted into the body of water from the array of towed airguns, are provided by microprocessor units and associated electronic circuits positioned in the respective junction boxes for serving as local control stations. These local control stations are connected by communication bus lines with a master control station on shipboard. These communication bus lines extend through the protective hose sheath which is pressurized and cooled with low pressure air as discussed above.

Additional advantages of this invention are those resulting from the fact that the respective junction boxes include electrical capacitors which are charged during the intervals between firings of the airguns and are controllably discharged in response to command signals sent from the master station over the communication bus lines for actuating the solenoid valves for firing the respective airguns. The monitored data relating to the operation of the respective airguns is temporarily stored in the microprocessor units and is thereafter retrieved by the master station upon command over the communication bus lines.

In carrying out this invention in one illustrative embodiment thereof a plurality of marine seismic survey airguns for generating seismic impulses in a body of water are suspended at spaced positions along a stress member which is adapted to be towed by a survey vessel. A high pressure air supply line for supplying all of the airguns and a protective hose sheath enclosing electrical wires are carried by this stress member forming a neat assembly of stress member, high pressure air line and low pressure protective sheath air hose containing wires which may be conveniently unreeled, towed and reeled on the survey vessel. A plurality of junction boxes are attached to spaced positions along the stress member for supplying and controlling predetermined airguns. The high pressure air line and the low pressure protective sheath air hose with its electrical wires are coupled to each of the junction boxes along the stress member. One or more predetermined airguns are coupled to each of the junction boxes from which each airgun is supplied with compressed air and electrical signals for controlling its firing, and monitoring signals are supplied to the junction boxes from the respective airgun.

BRIEF DESCRIPTION OF THE DRAWINGS

The invention, together with further aspects, advantages, features and objects thereof, will be more clearly understood from a consideration of the following description taken in conjunction with the accompanying drawings in which like elements bear the same reference numerals throughout the various views.

FIG. 14 is a schematic circuit diagram of one of the "Submerged Local Stations" shown in FIG. 8 for controlling an airgun.

DESCRIPTION OF THE PREFERRED EMBODIMENTS

Figures 1, 2, 3:
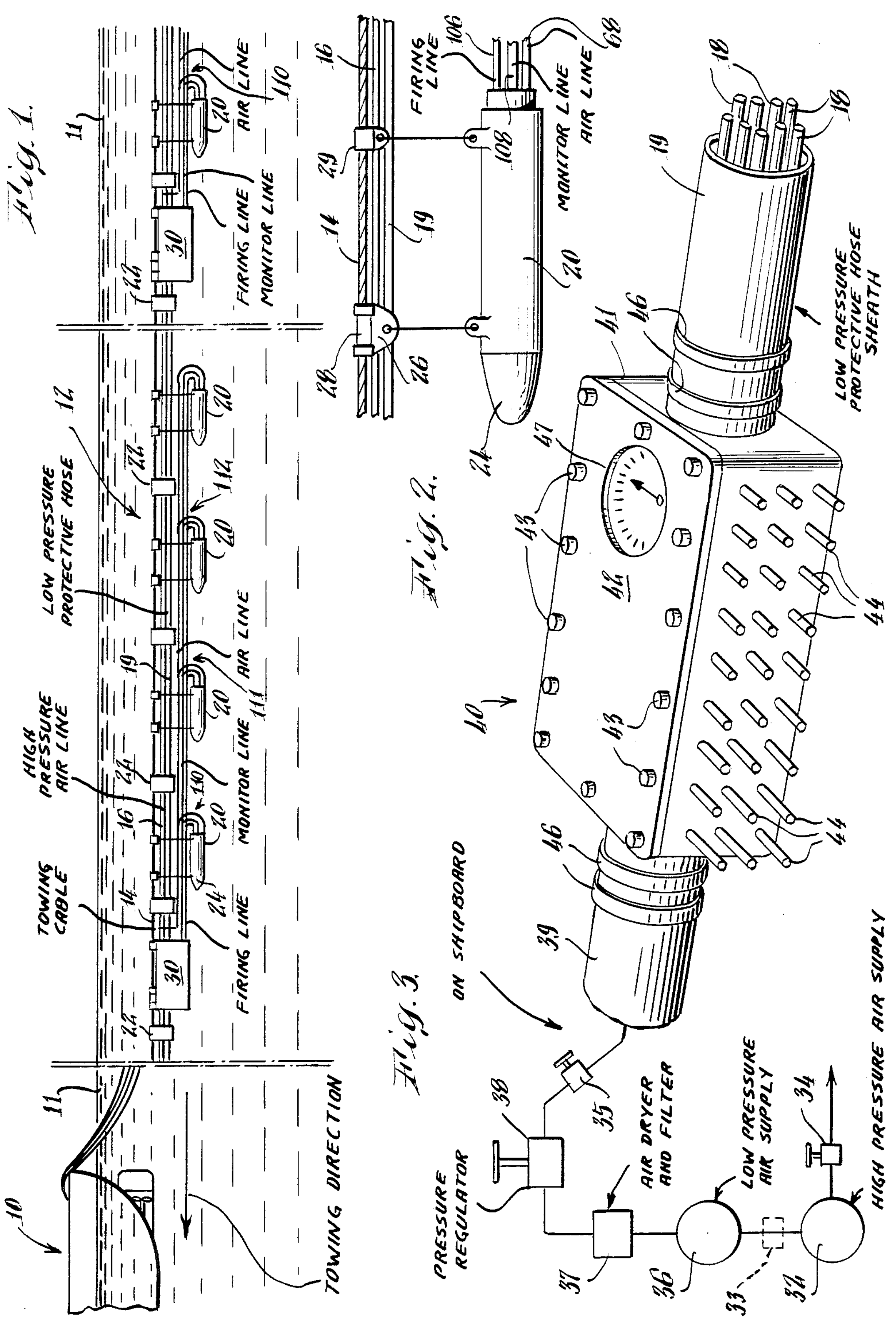
FIG. 1 is a side elevational view showing the modular airgun array apparatus and system of this invention in use being towed behind a survey vessel. This view is also illustrative of the employment of the method of the present invention.
FIG. 2 is an enlarged view of a portion of the array of FIG. 1 showing the connection of an individual airgun seismic energy source to the towing cable or stress member of the array.
FIG. 3 is a perspective view of the on-shipboard main junction box schematically illustrating how dry air is fed into the protective sheath hose line leading to the various submerged control station junction boxes in the modular array, as illustrated in FIG. 1.

Referring now to FIG. 1, a survey vessel 10 travelling on a body of water 11 is towing a multiple airgun marine seismic array, referred to generally with the reference number 12. The airgun array 12 is suspended from and is towed by a stranded steel wire towing cable or stress member 14 (FIG. 2) which also has attached thereto for ease of handling a high pressure air line 16. There are electrical lines 18 (FIG. 3) contained in a protective hose sheath 19 attached on the stress member 14 by hangers 22. The high pressure hose line 16 is attached on the stress member 14 by these same hangers 22. A plurality of airguns 20, which are shown as having a bullet or streamlined-shaped head 24 facing in the direction of towing, are suspended from bifurcated forward hangers 26, straddling a steel button 28 swaged onto the stress member 14, and from rear hanger 29, as will best be seen in FIG. 2. Submerged control station junction boxes 30, which will be described in detail hereinafter, are also suspended from the stress member 14. It is to be noted that the airguns 20 may not include the streamlined nose 24, but it is preferable to use such a nose.

The survey vessel 10 is equipped with a high pressure air supply 32 of conventional type which may include one or more high pressure air compressors (not shown). The compressed air supply 32 includes a suitable filter and a pressure regulator. The high pressure air for charging the airguns 20 is fed from the supply 32 through a shut-off valve 34. This high pressure air is supplied to the firing chambers in the respective airguns 20 as will be explained later and is released from the airguns through their discharge ports in response to electrical control signals for generating and transmitting the seismic impulses, i.e. pressure waves into the body of water 11.

In order to supply this high pressure air to the respective airguns 20, the high pressure air supply 32 is fed through the shut-off valve 34 and, in a manner to be described later, through the main high pressure air line 16 passing near the various junction boxes 30 in sequence and then from the junction boxes to the respective individual airguns 20.

The modular system in accordance with the present invention employs water-tight junction boxes 30 spaced along the stress member 14, each of which services a predetermined one or more of the airguns 20. Such water-tight construction is assured by supplying low pressure air to the interior of the junction boxes on the order of 5 to 15 p.s.i., or more, if necessary above the ambient water pressure in order to keep water out of the junction boxes, even if there are minor leakages. As shown in FIG. 3, low pressure air from a supply 36 is fed through an air dryer and filter 37, and through a pressure regulator 38, through a shut-off valve 35 and then through a hose line or pipe line 39 into an on-shipboard main junction box 40. Thus, the interior of the main junction box 40 is pressurized with dry, filtered low-pressure air as set by the regulator 38. The low-pressure air supply line 39 is shown secured by a pair of clamps 46 to a fitting on the main junction box 40.

If desired, the low-pressure air supply 36 may be a separate low-pressure compressor which is considerably smaller than the main high-pressure compressor or compressors 32 which supply the high-pressure air. Alternatively, as shown in dashed outline at 33, the low-pressure air supply 36 may be a tank into which is fed air at a suitable pressure, passing through a pressure-reducer 33 connected to the main supply source 32.

In order to explain the desired pressure level to which the regulator 38 is set, assume that the submerged junction boxes 30 are being towed at a depth of approximately thirty feet (approximately nine or ten meters) below the surface of the water 11. It is to be understood that appropriate depth control means as known in the marine seismic surveying art (not shown) are utilized for keeping the towed line array 12 including its multiplicity of airguns 20 and junction boxes 30 all at the desired depth below the surface of the water 11, for example, such as by means of support lines to a plurality of floats on the surface. Such depth control means are omitted in order to clarify the illustration. Thus, in this example, the junction boxes 30 are all at a depth of approximately 30 feet below the surface. Then, the ambient water pressure around the submerged junction boxes is approximately 15 p.s.i. above the atmosphere, due to the hydrostatic pressure of the water being added to the atmospheric pressure. Pressures above atmospheric are usually expressed as gauge pressure, i.e., p.s.i.g.; and so it will be understood hereafter that 15 p.s.i.g. means 15 p.s.i. above atmosphere, and so forth. Thus, the regulator 38 is set to approximately 20 to 30 p.s.i.g, or more so that the pressure within the submerged junction boxes 30 will exceed the ambient water pressure by at least 5 p.s.i., or even higher if necessary for assuring the exclusion of water.

The on-shipboard junction box 40 includes a housing 41 with a removable cover 42, an air-tight gasket between this cover and the housing. There are numerous fastening screws 43 for the cover. Sealed to the housing 41 of this junction box are a plurality of electrical terminals or binding posts 44 extending externally of the junction box 40 from one side thereof to which electrical connections can be made. Each of these terminals 44 is sealed to the housing 41 for preventing leakage of air from its pressurized interior. The output of this junction box has the protective hose sheath 19 coupled thereto in air-tight relationship by a pair of hose clamps 46. The protective hose 19 carries a plurality of electrical leads 18 which are adapted to carry the electrical control signals to the airguns for firing them as well as conveying firing information back to the on-shipboard junction box 40 for determining the actual exact firing instant of each of the airguns 20. This protective hose 19 also advantageously serves as the low-pressure air conduit for feeding low pressure air from this main junction box 40 to the various local submerged junction boxes 30 in the airgun array 12. By virtue of the fact that the hose sheath 19 is internally pressurized, water is excluded from entry if any loose connections or pin holes occur.

There is a Bourdon-type pressure gage 47 mounted on the junction box 40 by which the operator can ascertain whether all of the submerged junction boxes, each containing the local electronic control stations, are continuously being supplied with the low pressure air for internally pressurizing them for assuring protection from any intrusion of the water 11. Instead of the individual terminals 44 as shown there can be an air-tight multiple terminal bulkhead connector mounted in the wall of the housing 41 for making individual external connections to the individual wires 18.

Figure 6:
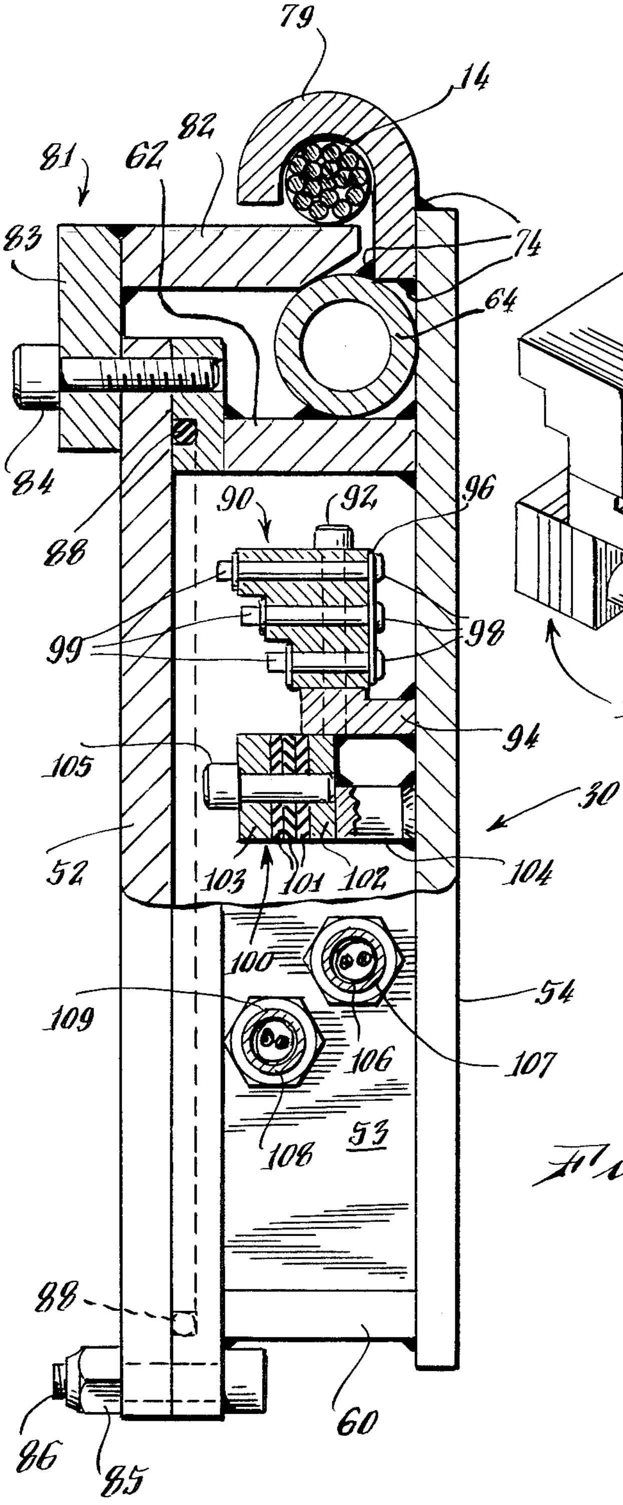
FIG. 6 is an enlarged cross-sectional view taken along line 6—6 in FIG. 5.

FIGS. 4 through 7 show an illustrative embodiment of the junction boxes 30 which are disposed at spaced intervals along and suspended from the stress member 14. The junction boxes 30 include a removable cover 52, and a housing 53 having a back 54, and a front 56, a rear end 58, a bottom 60 and a top 62. As seen at the left in FIGS. 4 and 5, the high-pressure air line 16 is removably coupled by a fitting 63 to a pass-through pipe 64 which extends a short distance out of the front end 56, and passes completely over the junction box 30 and extends a short distance out of the rear end 58 where it is removably coupled through an outlet fitting 63 to a continuation or link of the high-pressure air line 16. It is to be appreciated that by providing this type of removable coupling at each junction box 30 with a pass-through pipe 64, the high pressure air hose line 16 can be made in sections in modular form for adding or removing sections of hose line and junction boxes. This construction also enables the ready assembly and tapping in to the high-pressure air line 16 to accommodate the multiplicity of airguns in the array. As shown in FIG. 6, the pass-through pipe 64 is welded to the top 62 of the housing 53 of the junction box 30.

On the outlet end portion of the high-pressure, pass-through pipe 64, there is an air line tap-off 66 (FIG. 5) which couples the high-pressure air line 16 to the respective air gun or airguns operatively associated with that respective individual junction box 30. This tap-off connection 66 leads via a manually operable shut-off valve 67 into a flexible high-pressure air feed line 68 extending to the airgun or airguns associated with the particular junction box 30. In FIG. 1, there are shown three airguns 20 associated with each junction box 30.

Inviting attention back to FIG. 3, it is noted that the low-pressure protective hose sheath 19 is internally pressurized and contains the electrical lines 18. This hose sheath 19 is clamped by hose clamps 46 to a low-pressure inlet pipe 70 (FIG. 5) welded into and through the front end 56 of the junction box 30. Thus, low-pressure air pressurizes in the interior of the junction box 30 for keeping water out of the junction box. A low-pressure outlet pipe 76 is coupled by hose clamps 46 to a link or continuation of the low pressure protective hose sheath 19 which is fed to the input of the succeeding junction box 30, and so forth, along the array 12. It should be noted again that in this construction, the protective hose sheath 19 runs in a modular arrangement between each junction box 30. This modular low-pressure arrangement enables ready assembly and disassembly for adding or removing junction boxes and airguns. Additional airguns and junction boxes may be added to the array at will without requiring hoses 68 (FIG.5) to extend the entire length of the array in a bulky umbilical assembly.

Figures 4, 5:
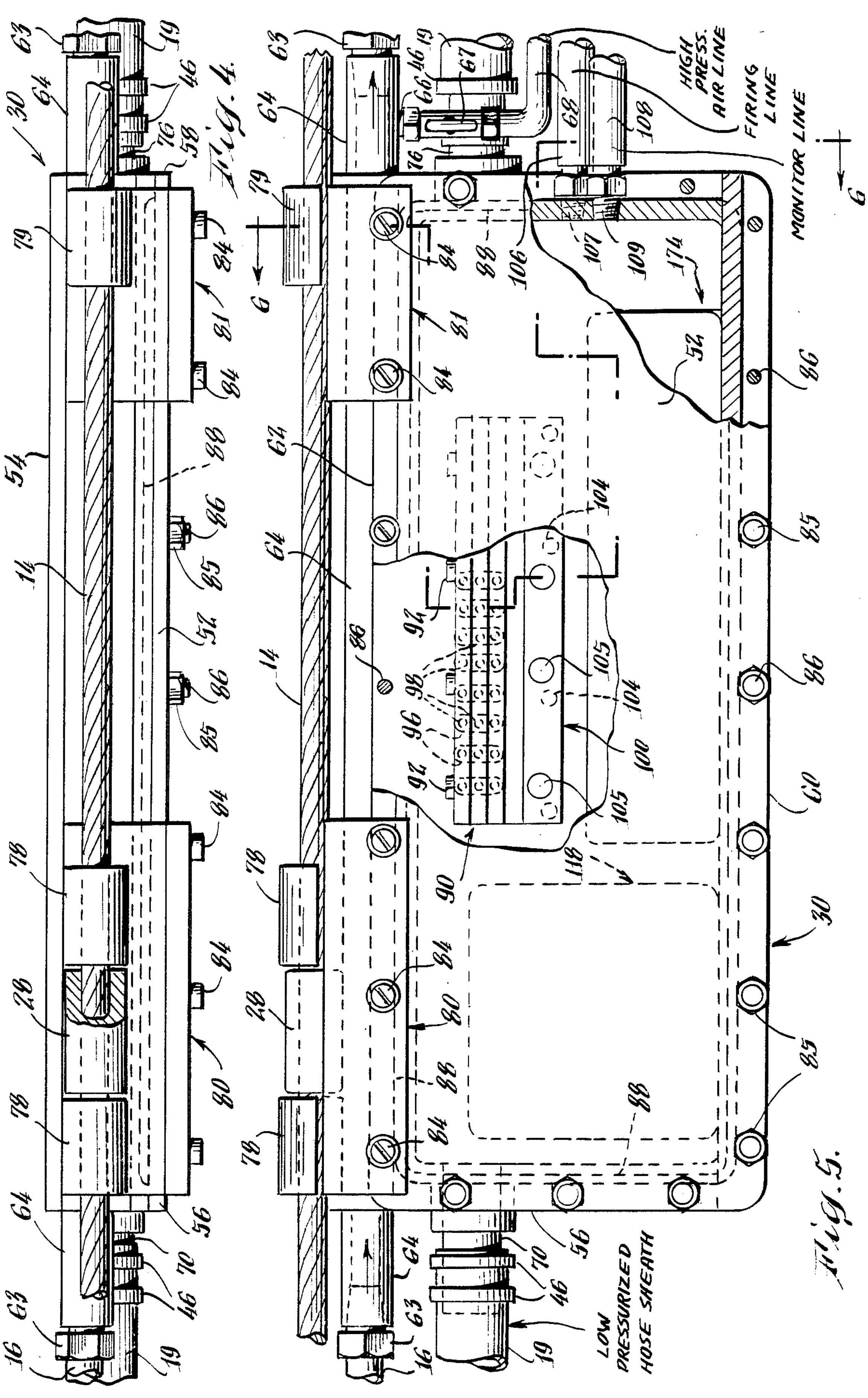
FIG. 4 is a top plan view of one of the submergable water-tight junction boxes or cannisters with internal low pressure air pressurization; this station box or cannister is shown supported on the towing cable stress member.
FIG. 5 is a side elevational view of the control station junction box of FIG. 4, with a portion of the cover shown cut away to reveal internal structure.

As will best be seen in FIGS. 5 and 6, the rear hanger or hook 79 is affixed by welding at welds 74 to the housing back 54 and to the pass-through pipe 64. The front hanger or hook 78 is bifurcated so that it can straddle one of the steel buttons 28 permanently swaged onto the stress member 14. These buttons 28 are permanently swaged onto the stress member 14 at predetermined intervals for assuring that each junction box 30 and each airgun 20 will continue to hang from the stress member at the desired locations as the array 12 (FIG. 1) is towed through the water. The pair of front hooks 78 are welded onto the housing 53 similar to the rear hook 79.

In order to removably lock the hooks 78 and 79 into engagement onto the stress member 14, there are respective front and rear L-shaped latch members 80 and 81. As seen in FIG. 6, each such latch member includes a top plate 82 which projects inwardly below the stress member 14 for preventing the hook 78 or 79 from becoming unhooked from the stress member 14. In other words, the stress member 14 is captured in the hook 78 or 79 by this locking plate 82. The latch member 80 or 81 also includes a side plate 83 which is removably fastened to the upper portion of the housing 53 by a plurality of machine screws 84.

The cover 52 is removably secured to the housing 53 by a plurality of the machine screws 84 and by nuts 85 on studs 86. There is an O-ring gasket 88 seated in a groove in the housing beneath the cover for providing a fluid-tight seal for the junction box 30.

In the interior of the junction box 30, a step-like terminal block 90 (FIG. 7) of a suitable dielectric material, for example, such as a phenolic material, is mbunted by screws 92 to a steel mount or bracket 94 which is welded to the back 54. The terminal block 90 has a plurality of conductive straps 96 mounted thereon, each strap by a plurality of screws 98 which extend through the terminal block 90 and form binding posts 99 on the front ends thereof. Thus, each vertical row of binding posts 99 are tied together electrically by a strap 96. An anti-vibrational clamp 100 is mounted on a flat steel bar 102 which, in turn, is secured onto posts 104 which are welded to the back wall 54.

The firing wires and the monitoring wires 18 (FIG. 3) are contained within the protective hose sheath 19 (See also FIG. 5). These wires 18 enter the first junction box 30 through the inlet pipe 70 at the left in FIG. 5, and the ends of these wires are connected to the respective terminals or binding posts 99 in the upper tier. In order to make connection with the next junction box 30, there are similar wires whose ends are attached to the second tier of binding posts 99, and these wires extend out through the outlet pipe 76 and into the next successive section of protective hose 19 running to the next junction box and so forth along the array 12.

In order to damp out vibrations in them, all of the wires to the various binding posts 99 extend through and are clamped in the anti-vibration clamp 100. This clamp includes a plurality of separate pad-like strips 101 of resilient insulating material, for example of rubber, held by a top bar 103 removably fastened by machine screws 105 to the bottom bar 102. The wires to be clamped are laid between the resilient pads 101 and then are firmly clamped in place by tightening the screws 105.

In order to connect the solenoid firing valve or valves of the airgun or airguns to the junction box 30, there is a firing line 106 containing two conductors for each solenoid valve being controlled. The solenoid valve(s) are actuated for firing the respective airgun(s) by transmitting a brief electrical pulse, called a "firing signal", over the firing line 106 to the respective solenoid valve(s). These conductors in the firing line 106 are connected by terminating connectors to the desired binding posts 99 in the third tier. It is to be noted that the firing line 106 includes a tough, insulating jacket. The firing line passes through a port 107 in the rear end 58 of the junction box 30, and its jacket is sealed in the port 107 in the fluid-tight relationship.

For monitoring the actual instant of firing of the airgun or airguns associated with the junction box 30, there is a monitoring transducer line 108 passing through a port 109 in the rear end 58 of the junction box, and its jacket is sealed in fluid-tight relationship in this port 109. Associated with each airgun is an electromechanical transducer, for example such as disclosed and claimed in U.S. Pat. Nos. 4,210,222; 4,240,518; 4,286,687 and 4,301,887. Such a transducer initiates a brief, sharp electrical signal at the actual instant of firing of the airgun for monitoring the operation of each airgun. By keeping track of these monitoring signals, the responsible personnel on shipboard and/or automatic controllers can determine whether all of the airguns are firing or not, the instant when each one is firing relative to the others, and relative to the instant when the firing signal which was transmitted to that particular airgun, and if any airgun is malfunctioning. The timing of the firing signals for each airgun can then be adjusted in accordance with the monitored data for causing the firing instant of each airgun to be in conformance with the predetermined desired seismic survey program for optimizing the geologic data being obtained by the survey. Also, any malfunctioning airgun, or one which is wasting high pressure air through leakage, can be shut off by remote control, as described and claimed in U.S. Pat. No. 4,240,518 referred to above.

There is a preferred alternative way of connecting the low pressure hose sheath sections 19 to the junction boxes 30 instead of by means of hose clamps 46 secured to short sections of pipe 70 or 76. These hose sheaths are connected by such hose clamps to a conventional fluid-tight coupling having a coupling nut. A complementary conventional fitting having an externally screw-threaded connection region is secured to the junction box 30 instead of the short pipe section 70 or 76 which is now shown. Then, the coupling secured to the end of the hose sheath 19 is removably connected in fluid-tight relationship to its complementary fitting on the junction box by screwing the coupling nut onto the externally threaded connection region of this complementary fitting. The advantage of using such conventional couplings and fittings is that the job of connecting these hose sheaths onto the junction box and of disconnecting them therefrom is made easier. Also, many spare sections of the hose sheath 19 can then be pre-assembled with their couplings. These pre-assembled sections of the hose sheath 19 are stored on shipboard ready to be used when making up the array line 12 of airguns or when adding additional junction boxes and airguns to this array line. The desired group of electrical conductors with terminals pre-attached to the ends of the conductors are strung through each hose sheath section 19 before the hose sheath section is coupled to the junction box by means of its coupling.

In FIGS. 5 and 6, the firing line 106 has its jacket secured in fluid-tight relationship in the port 107 of the junction box 30, and similarly the monitor line 108 has its jacket secured in fluid-tight relationship in its port 109. A presently preferred alternative arrangement is to enclose the electrical firing line 106 and the electrical monitor line 108 each within a protective hose sheath similar to the hose sheath 19 and having a conventional coupling pre-assembled to each end. A conventional complementary coupling fitting is then screwed into each of the ports 107 and 109. A conventional complementary coupling fitting is installed on the solenoid valve at the location where the firing line 106 connects to the solenoid valve. Another such fitting is installed on the solenoid valve where the monitor line 108 connects to the transducer in the solenoid valve. The firing line 106 and the monitor line 108 are each thereby enclosed within a separate protective hose sheath filled with the low pressure air for excluding water. One end of each such protective sheath is coupled by its fitting in fluid-tight relationship to the junction box 30, and the other end is coupled by its fitting in fluid-tight relationship to the solenoid valve. Consequently, the entire length of each firing line 106 and monitor line 108 to and including its connection to the housing of the solenoid valve on the airgun is protected from contact with water by a protective envelope of air at a pressure exceeding ambient water pressure.

If more than one airgun 20 is being controlled by a given submerged junction box 30, then the high pressure air line 58 and the firing line 106, and the monitoring transduer line 108 (FIG. 5) are each branched at 110, 111 and 112 (FIG. 1). Thus, two conductors for firing and two conductors for monitoring, plus a high pressure air feed line extend from the junction box 30 to each airgun being controlled.

The modular airgun array in accordance with the present invention advantageously includes junction boxes 30 selectively positioned along the stress member or towing cable 14. The only long or unbroken line in this system is the stress member 14 which extends for the entire length of the airgun array 12. The junction boxes 30 provide a pass-by connection 64 for the high pressure air of the system, and also provide for pressurization and pass through of low pressure air, so that it is fed from one submerged junction box to the next. Also, as is explained above, the low pressure air is preferably arranged to protect each of the firing lines 106 and each of the monitoring lines 108.

The number of airguns 20 may conveniently be changed depending on the seismic survey program and the desired length of the array of airguns to be towed. This modular system enables rapid testing, location, and diagnosis of malfunctioning components by opening the respective junction box to obtain access to the terminals 99. Furthermore, the modular system enables shorter standardized high pressure hose sections 16 and low pressure hose sheaths 19 and shorter sections of wire 18 to be used, and thereby facilitating rapid assembly and/or disassembly of the airgun array 12.

Figure 8:
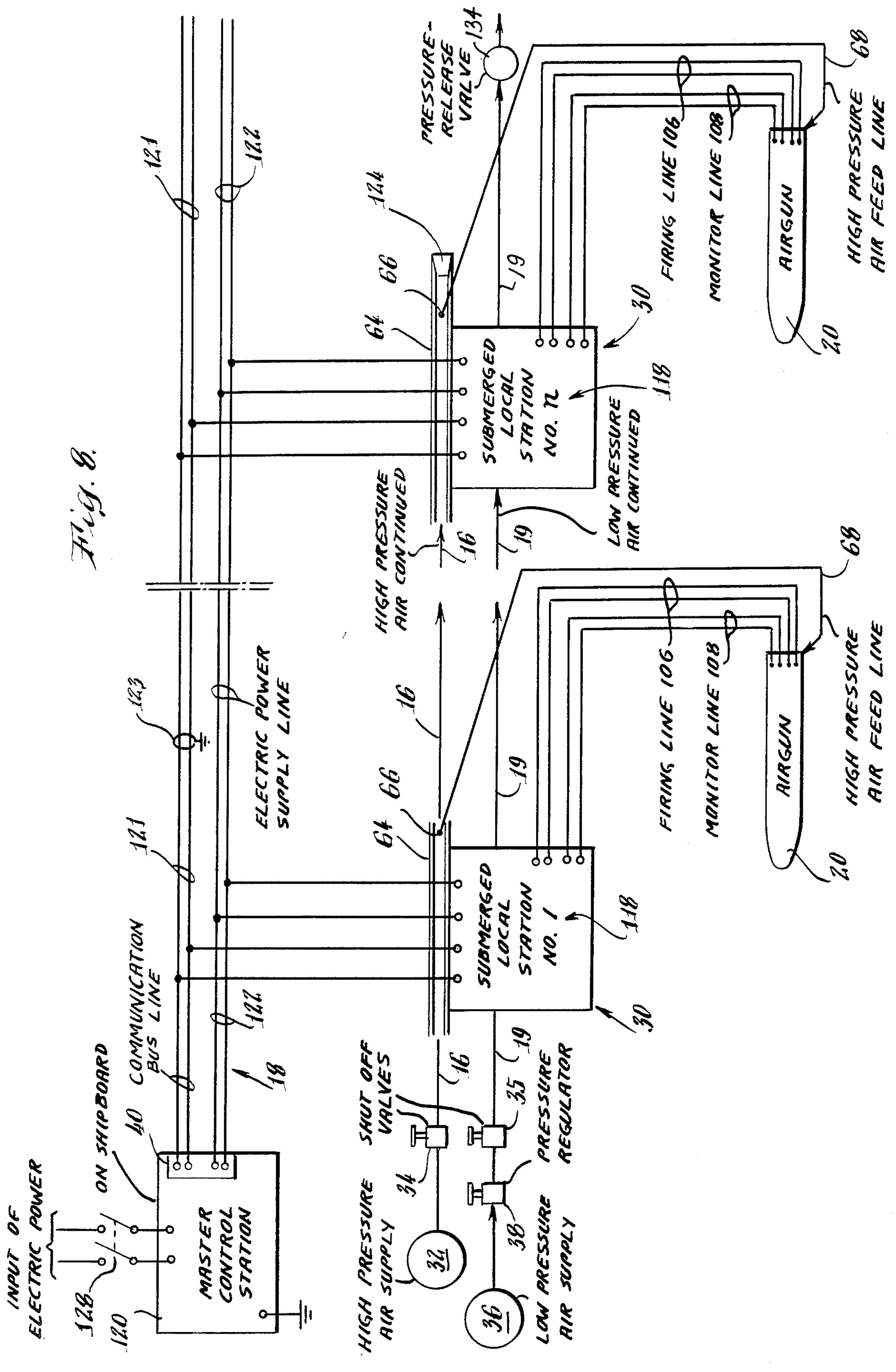
FIG. 8 is a schematic diagram of electrical, electronic, and pneumatic circuits for the modular airgun array.
Figure 9:
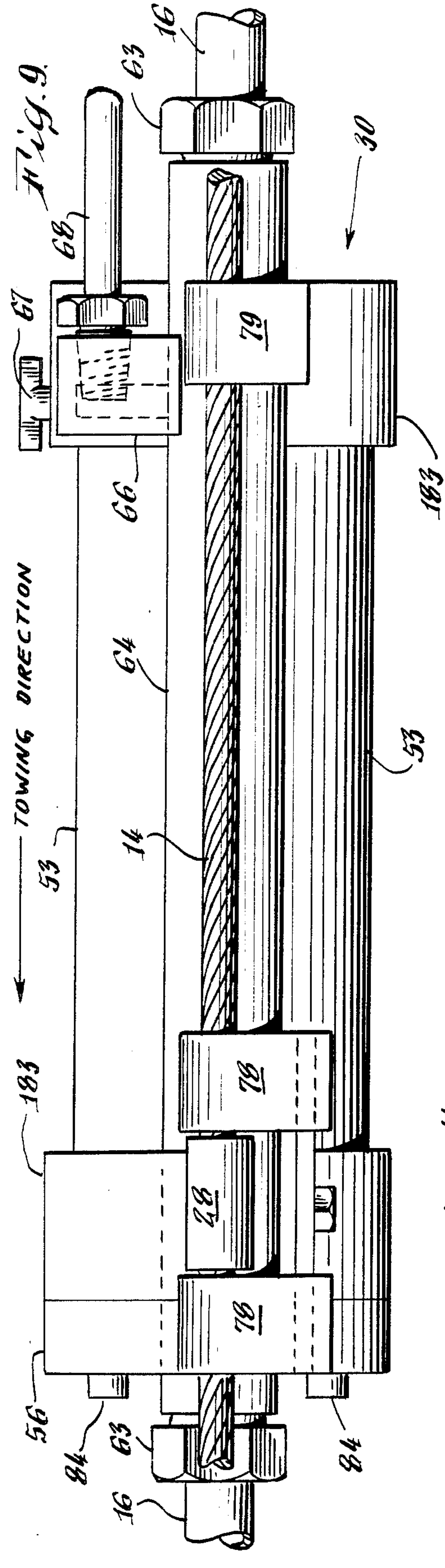
FIG. 9 is a top plan view of an alternative submergible, water-tight control station junction box or cannister with internal low pressure air pressurization. This station box is shown supported on the towing cable stress member.
Figure 10:
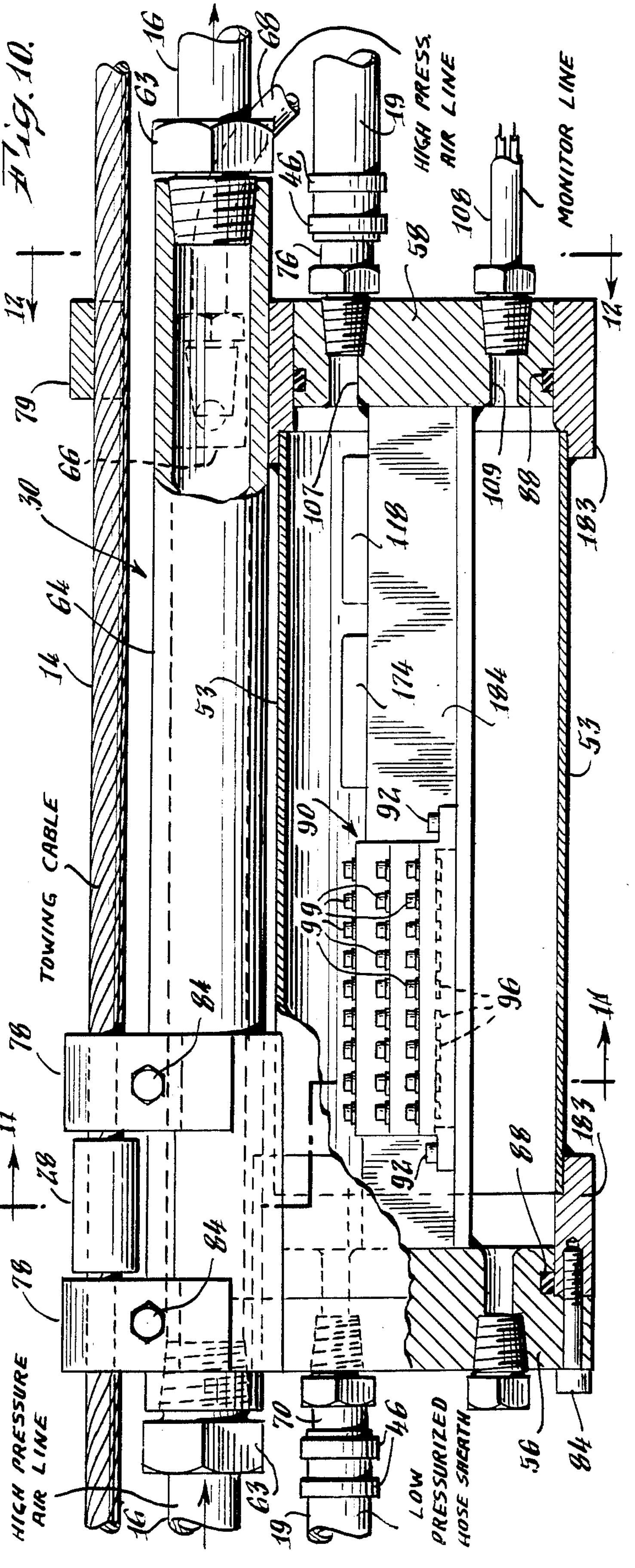
FIG. 10 is a side elevational view of the control station junction box of FIG. 9 with a portion cut away to show the interior.
Figure 11:
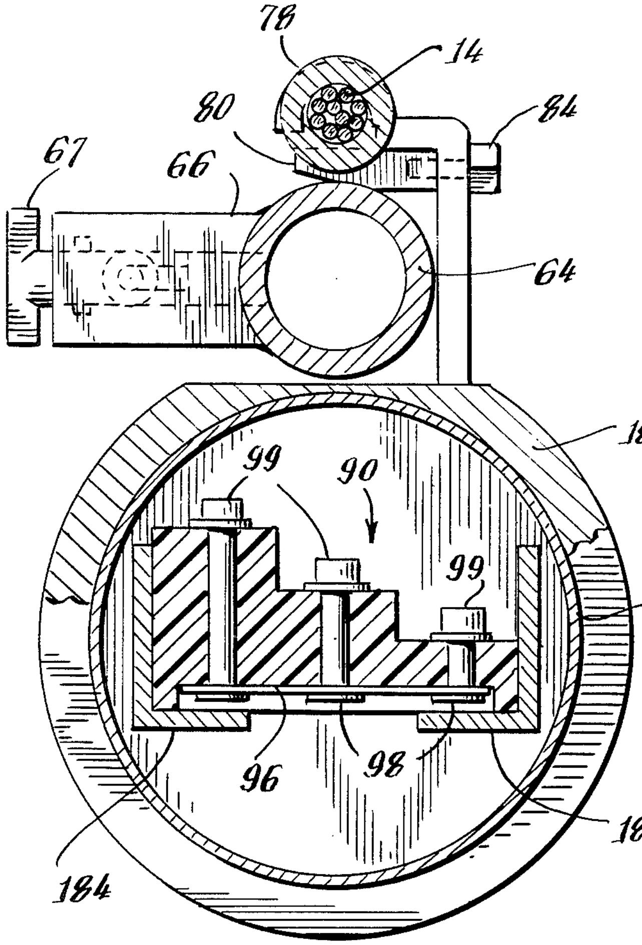
FIG. 11 is a cross-sectional view taken along the line 11—11 in FIG. 10.
Figure 12:
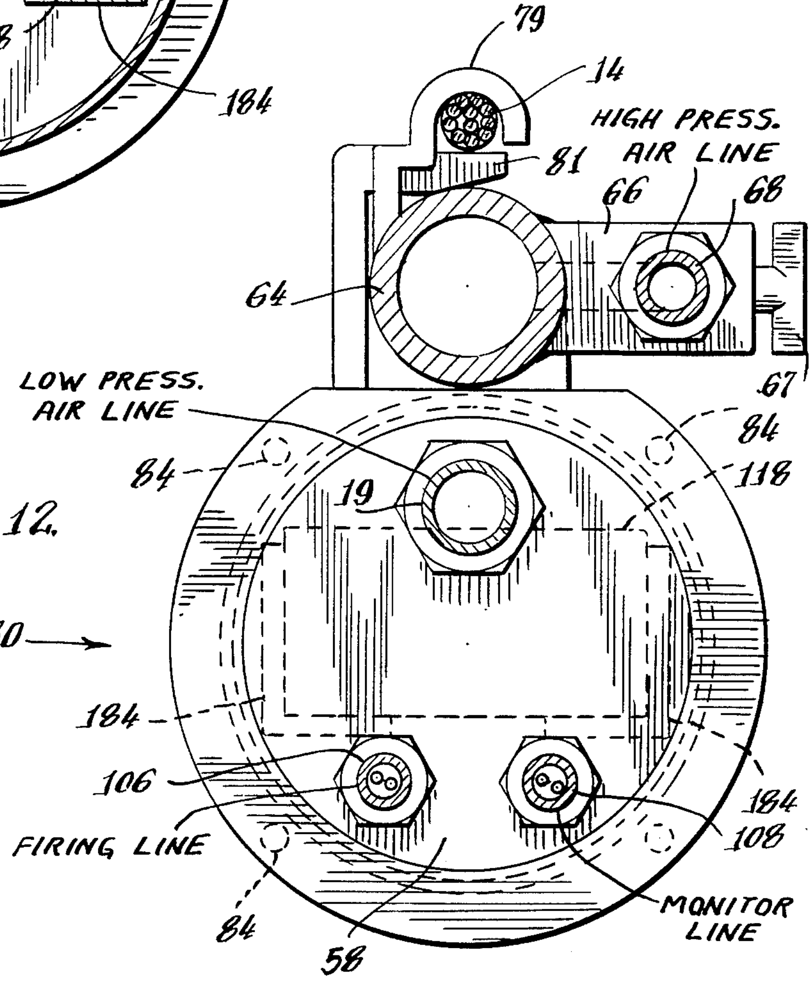
FIG. 12 is a cross-sectional view taken along the line 12—12 in FIG. 10.

Advantageously, as shown in FIG. 8, these submerged junction boxes 30 enable localized remote control stations 118 to be employed so that the number of wires 18 extending from the main terminal box 40 in the master control station 120 on shipboard can be reduced to four in number by including in each of the submerged junction boxes 30 such local electronic control stations 118, as will be explained later in detail. Two of these conductors are a twisted pair of insulated wires forming a communication bus line 121 which may be electrically shielded by a surrounding shield braid 123. Alternatively, this communication bus line 121 may be en electrical coaxial cable. The other two conductors are a pair of wires 122 for serving as an electric power supply line for feeding electric power to each of the remote control stations 118 in each of the junction boxes 30.

It is to be understood in reading FIG. 8 that the four wires 121 and 122 are contained within a protective hose sheath 19 extending from the junction box 40 (FIG. 8) and which is pressurized as shown in FIG. 3. For clarity and convenience of illustration in FIG. 8, the hose line 19 is shown as a line spaced away from the communication bus line 121 and from the electric power line 122.

Similarly, the high pressure air line 16 is illustrated spaced away from the communication bus line 121 and away from the electrical power line 122.

Each of the local stations 118 is energized by electric power transmitted over the power line 122, for example 120 volts alternating current (A.C.) at 60 Hz or 50 Hz. Each local station 118 includes a local power supply for converting the A.C. power into D.C. power of the desired voltage for energizing the electronic hardware, as will be explained later in considering FIG. 14. Instead of 120 volts, 60 Hz (or 50 Hz), this A.C. electric power may advantageously be 50 volts, 60 Hz or 50 Hz or 50 volts, 400 Hz or any other suitable voltage and power frequency. The advantage of 50 volts as compared with 120 volts is that it is safer for personnel on shipboard.

Figure 13:
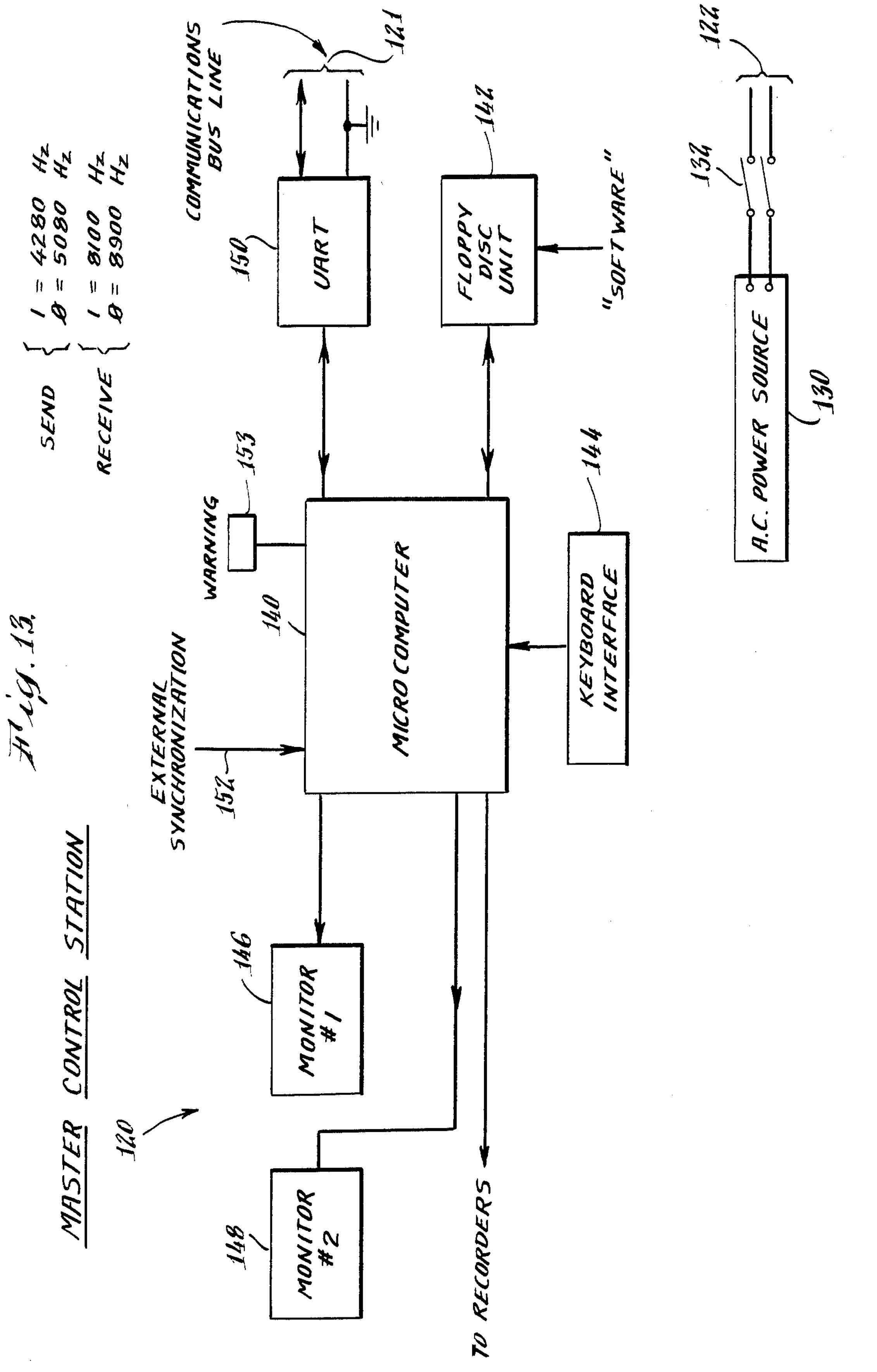
FIG. 13 is a schematic circuit diagram of the "Master Control Station" shown in FIG. 8.

As shown in FIG. 8, the master control station 120 is energized by electric power through a shut-off switch 128. This master control station 120, as seen in detail in FIG. 13, includes an A.C. power source 130, for example such as a stepdown transformer for reducing its output voltage to 50 volts on the supply line 122. This source 130 feeds through a shut-off switch 132 into the two insulated conductors of the electric power supply line 122 (FIG. 8).

The master control station 120 (FIG. 13) includes a microcomputer 140, which may be any one of the personal computers now commercially available, for example such as an Apple Computer II Plus, and IBM Personal Computer, a Texas Instruments Computer, etc. This microcomputer 140 includes connection ports for connection to the following: a floppy disc unit interface 142, a keyboard interface 144, a video screen monitor interface 146 ("Monitor No. 1"), optionally a second video screen monitor interface 148 ("Monitor No. 2") which may be located remotely from the keyboard 144, for example at a recording station or on the bridge of the survey vessel 10 (FIG. 1), and a UART communications interface 150 (universal assynchronous receive and transmit) for enabling communications to be transmitted from and received by the microcomputer 140. A frequency-shift keying (FSK) communications system is used, with information being encoded in binary code. This is a full duplex FSK communication system, meaning that there is capability for communications to be transmitted in both directions at the same time over the same communications line 121.

The UART communications interface unit 150 includes the necessary oscillators and line driver power amplifiers with appropriate low impedance output for assuring that the signals are reliably transmitted over the communications bus line 121 for the entire length of the array 12, which may include up to one hundred airguns or more and may extend up to 1,000 feet in length or more.

In this presently preferred FSK system, in sending information from the master control station 120, a binary code "1" is transmitted at 4280 Hz and a "0" at 5080 Hz. In receiving information, a "1" is received at 8100 Hz and a "0" at 8900 Hz. The software for programming the microcomputer 140 is entered by a floppy disc inserted into the unit 142. The human operator commands the operations by using the keyboard 144 and receives back information on the operations by watching the nearby video screen monitor 146.

The method, apparatus and system of the present invention advantageously provide for considerable flexibility and adaptability in writing the software to be used. The various marine seismic surveying organizations and teams who will be employing this method, apparatus and system may wish to write their own software programs or may wish to modify the software program as set forth below, because these various organizations and teams often have evolved particular or specialized surveying techniques and procedures which they have found to be beneficial for their work. Accordingly, it is to be understood that the operating program as set forth below is intended to be illustrative, i.e. an example, of a suitable and practical program.

When starting operations, the first video display at 146 and 148 appears, for example, as follows:

| CONTROLLER | |
|---|---|
| GUN | ID |
| 1 | |
| 2 | |
| 3 | |
| 4 | |
| . | |
| . | |
| . | (∅, ∅) TO CONTINUE |
| ENTER GUN, ID | |

It is to be understood that the first video display which appears will depend upon the particular software being used. The first display, as shown above, is a practical example of an appropriate first display.

This first video display reminds the operator to enter via a keyboard 144 the identity (ID) of each of the local control stations 118 (FIG. 8) associated with the respective airguns 20 which are numbered sequentially 1, 2, 3, 4, . . . n in the array 12 (FIG. 1). The airguns may be numbered sequentially in the array 12 from front to rear or from rear to front, as may be desired. In accordance with this desired predetermined sequence, the first airgun 20 is considered to be "GUN 1", the next airgun is considered to be "GUN 2", and so forth. The reason for entering the GUN identity is that each of the local control stations 118 includes a plug-in module which enables that particular station to be uniquely identified by inserting such a module. Thus, in making up the array 12, there is the flexibility for plugging any handy identity module into any local station 118. For example, the local station associated with GUN 1 may actually have identity module number 37 plugged into it, the station associated with GUN 2 may have identity module number 64, and so forth.

The reason for the flexibility in identification is that identity modules may become lost, and it is desirable to have spares on hand with non-duplicating numbers. Also, local junction boxes 30 may be removed and replaced for servicing or due to malfunction. Once this actual identity information has been entered into the microcomputer 140, thereafter the GUN numbers will be displayed on the monitor screens 146, 148 in accordance with their sequential positions in the array 12.

As soon as the foregoing identity information has been entered for all of the airguns in the array, the operator appropriately actuates the keys (0, 0 Return) of the keyboard 144 for causing the second video display at 146, 148 to appear, for example, as follows:

| MENU |
|---|
| 1. LOCK |
| 2. UNLOCK |
| 3. LOAD |
| 4. UNLOAD |
| 5. FIRE |
| 6. AUTO |
| 7. CHANGE SYNCH 8 SEC |
| 8. EXTERNAL SYNCH |
| SELECT # FROM MENU |

Before discussing this menu, it will be helpful for the reader to note that when the system is initially energized, all of the local control stations 118 (FIG. 8) "wake up", i.e. become energized, always in the same control condition, namely, they all are initially in their "LOCK" condition. When in the "LOCK" condition, each local station 118 will accept only a message bearing its identity number followed by an "UNLOCK" command. So long as a local station 118 is in the "LOCK" condition, its associated airgun cannot be loaded, unloaded or fired.

Each message command which is transmitted to a local station is preceded by the identity number (the address) for that station. After being unlocked, a "LOAD" command causes the addressed airgun to become charged with high pressure air. An "UNLOAD" command causes it to become uncharged. A "FIRE" command means a manual firing operation for an addressed GUN, so that the operator can test that particular local station with its associated airgun to be assured that the airgun is operating properly. Thus, each individual airgun can be manually fired for minitoring its operation, before commencement of the seismic surveying operations. An "AUTO" command causes the airguns to be fired automatically in accordance with a predetermined survey program. For example, the airguns may be fired simultaneously or sequentially at a repetition time interval of every eight seconds for firing the whole array 12. This time interval for firing the whole array may be shorter or longer, as desired. The "CHANGE SYNCH" command enables the operator to set the time interval for automatic firing of the whole array. In this example, it is shown as being 8 seconds in the above video display.

The "EXTERNAL SYNCH" command causes the automatic firing to be controlled in accordance with any desired external signal. These external synchronizing signals for controlling the "AUTO" (automatic)

firing operations are fed into the microcomputer 140, as illustrated at 152. For example, such external synchronization 152, if desired, may arise from the navigational control equipment on the ship 10 in accordance with the ship's plotted geographical position on the body of water 11, as determined by means of navigational sattelites or other navigational techniques. Therefore, the airguns in the array 12 can be fired automatically at predetermined geographical coordinates in accordance with a predetermined seismic survey plan, if desired.

After the desired operating procedures have been selected from the MENU display, the keyboard 144 is actuated by the operator for causing a third display on the video screens 146, 148 to appear, for example, as follows:

| | GUN ARRAY #1 | | | |
|---|---|---|---|---|
| GUN | TARGET | CMD | ACTUAL | AVG |
| 1 | | | | |
| 2 | | | | |
| 3 | | | | |
| 4 | | | | |
| . | | | | |
| . | | | | |
| . | | | | (∅, ∅) TO START |
| GUN, TARGET? | | | | |

The "GUN" numbers will be understood from earlier explanation. The "TARGET" is the time interval intended by the program to occur between the automatic transmission of a firing signal ("AUTO" mode) and the actual instant of firing of the particular GUN. The actual instant of firing, "ACTUAL", sometimes called the "Time Break", is determined from the signal appearing on the monitor line 108 (FIGS. 8, 5 and 6). For example, this "TARGET" time interval may be 30 milliseconds. The "ACTUAL" reading is the actual time interval and may, for example be 31 milliseconds. The "AVG." reading is the running (rolling) average of the last five actual readings. The firing signal "CMD" for each particular GUN is automatically adjusted by the program to compensate for the difference between TARGET reading and AVG. reading.

If, for example, the AVG. reading for GUN 3 is 31 millisecs., and the TARGET reading is 30 millisecs., then the firing CMD signal for GUN 3 is automatically decreased to 29 millisecs. to compensate for the fact that the AVG. reading is one millisecond behind the TARGET reading, and so forth, for each gun.

Conversely, if GUN 5 has an AVG reading of 28 millisecs., its firing CMD signal is automatically increased to 32 millisecs. to compensate for the two millisecond lead of the AVG reading ahead of the TARGET reading.

It is to be understood that this specific concept of automatically adjusting firing command signals for compensating for idiosyncracies in the actual firing characteristics of airguns and their associated solenoid valves is already known in the art, for example as described in U.S. Pat. Nos. 4,210,222 and 4,240,518, both assigned to the same assignee as the present invention, with their incorporated reference to U.S. Pat. Nos. 4,034,827 and 4,047,519, both assigned to Texas Instruments, Incorporated.

The operator can manually adjust or set the TARGET time for each GUN, if desired, as shown by the query at the bottom of the above third display.

After the TARGET firing times have been set, and assuming that the "AUTO" firing mode has been selected, the keyboard 144 is appropriately actuated by pressing the keys O, O Return for starting the automatic firing of the array 12 in accordance with the survey program, which may include external synchronization 152 (FIG. 13) as described above. If a GUN fails to fire, an appropriate warning signal is given to alert the operator, such as by a light or buzzer 153 and an asterisk appears under ACTUAL for the malfunctioning GUN.

As shown in FIG. 8, each of the submerged local control stations 118 is electrically connected to the communications bus line 121 and to the electric power supply line 122.

In FIG. 8, there are a total of "n" stations 118 shown, for example, eighty. The high pressure air by-pass pipe section 64 mounted on the junction box 30 (FIGS. 4–6) for the nth station 118 is terminated at its far end by a plug 124. The low pressure line 19 is terminated beyond the junction box 30 for this nth station by a pressure relief valve 134 set to open at a predetermined pressure exceeding the ambient water pressure, for example at a pressure level of approximately 25 to 35 p.s.i. above atmosphere, or even more. During normal operation, the pressure regulator 38 (FIG. 3) is set at a pressure of approximately 20 to 30 p.s.i. or even more above atmosphere as monitored by the gage 47. In other words, the regulator 38 is set at a pressure level to exceed the ambient water pressure surrounding the junction boxes 30 but below the predetermined level for causing the relief valve 134 to open itself.

When the array 12 is ready to be hauled out of the water, the pressure level of regulator 38 is adjusted upward sufficient to open the relief valve 134. Consequently, a continuous flow of cool, dry air passes through the protective hose sections 19 and through all of the junction boxes 30 for cooling the electronic and electrical components of the local control stations 118 therein when the array is lying on shipboard in sunshine.

FIG. 14 shows the details of one of these local control stations 18. The electrical power line connection feeds the power supplies unit 156. This unit 156 is capable of supplying three regulated D.C. voltages, namely, positive 5 volts D.C., positive 15 volts D.C., and positive 100 volts D.C. In addition, this power supplies unit 156 feeds an unregulated positive 12 volts to an anti-firing circuit 158 for reasons to be explained later.

The local station 118 includes logic circuits 160 including a 6511 microprocessor chip now commercially available from various sources and an EPROM of suitable capacity, for example such as an EPROM 2716 chip commercially available from Intel. Associated with the logic circuits 160 is a clock 162 including a stable crystal oscillator and frequency dividers for measuring time intervals at a counting rate of, for example, one quarter of a millisecond.

The function of the identity plug-in module 164 has been fully explained in connection with the first video display. The advantage of using such a plug-in module is that its own identity number, for example, "37" or "64" (these numbers were used in the previous explanation) is shown clearly and boldly on the module itself. Therefore, there is very little likelihood of confusion, and there is no possibility of duplication, because no two of the identity modules 164 on shipboard have the same number.

There is a UART communications interface unit 166 connected to the communications bus line 121 (FIGS. 8 and 13), and also connected by an INFO (information) bus 165 to the logic circuits 160. This UART unit 166 includes the necessary oscillators and line driver power amplifiers with appropriate low impedance output for assuring reliability of communications to the master control station 120 (FIG. 13) over a long communications bus line 121 connected to numerous local stations 118. The UART unit 150 (FIG. 13) includes a UART chip No. 6402 made by Intersil, but the UART unit 166 (FIG. 13) need not contain such a chip, because the 6511 microprocessor chip in the logic circuits 160 can be made to perform functions corresponding to a 6402 UART chip.

The UART communications interface 166 (FIG. 14) sends a "1" at 8100 Hz and a "0" at 8900 Hz. It receives a "1" at 4280 Hz and a "0" at 5080 Hz.

The monitor line 108 is connected into the logic circuits 160 for feeding a signal at the actual instant of firing of the associated airgun. Within the logic circuits 160 is a remotely pre-settable counter which is remotely initially set by the operator to the desired "TARGET" firing time delay, for example 30 millisecs., as discussed earlier above. However, the counting time of the individual counter in the logic circuits 160 is automatically adjusted during operation, as explained above, to compensate for any difference between the rolling average "AVG." of the last five actual ("ACTUAL") firing times and the "TARGET".

Thus, the firing command "CMD" signal which is sent over a COMMAND BUS 168 from the logic circuits 160 to a bank of OPTO-ISOLATORS 170 occurs at a count which is in accordance with the TARGET time interval, which was pre-set into the local counter, as modified by a compensating adjustment, if any, of the local counter. This concept of having a remotely presettable local counter in a submerged local control station associated with an airgun is believed to be novel, as are many other aspects of this method, apparatus and system.

When in the AUTO mode (automatic firing), the firing signal is simultaneously addressed in common over the communications bus line 121 to all of the local stations 118. These stations all have a common address binary code (in addition to their unique address binary code which is established by the plug-in identity module 164). Thus, the local stations can all be simultaneously addressed during automatic firing. Upon reception of the commonly addressed firing signal, all of the individual counters in the logic circuits 160 in all of the local stations 118 begin counting down to their individually pre-set and automatically compensating adjusted "CMD" firing time intervals. When the counter reaches this "CMD" firing time, a firing signal is transmitted over the COMMAND bus 168 through the optical isolation circuit 170 to the airgun firing circuit 172 causing a pre-charged capacitor 174 to be suddenly discharged for sending a powerful electrical pulse over the firing line 106 to the solenoid-controlled valve on the airgun 20 for firing it.

The local counter keeps counting after the firing signal has been transmitted over the COMMAND bus 168. This local counter keeps counting until a signal is received over the monitor line 108 indicating the actual instant of firing. This signal on the monitor line 108 stops the counter, thereby determining the actual delay between the sending of the firing command signal on bus 168 and the actual firing. This actual delay count is temporarily stored in a memory in the logic circuits 160.

After the automatic firing has occurred, the master control station 120 individually addresses and interrogates each of the local stations 118. It interrogates each local station to ask for the actual delay count to be transmitted back to the master control station. The logic circuits 160 transmitted this actual delay count over the INFO bus 165 and thence to the master control station.

If the local counter keeps counting for a predetermined long length of time, for example up to 64 milliseconds, without receiving any signal over the monitor line 108. Then, such a long count indicates that the airgun has not fired. When the master control station interrogates and receives back a count of 64 milliseconds, the warning 153 (FIG. 13) is actuated and an asterisk appears under ACTUAL for that particular malfunctioning airgun.

The 100 volt D.C. is used to pre-charge the firing capacitor 174 which has a capacitance of 2,000 microFarads. Actually, the most convenient expedient is to use two 1,000 microFarad capacitors connected in parallel, these two capacitors also being shown at 174 in FIG. 5.

The reason for the OPTO-ISOLATOR circuit 170 will now be understood. It serves to protect the logic circuits 160 from the relatively high voltages and relatively large current pulses which occur in the gun firing circuit 172 as a result of the sudden discharge of the large capacitance involved.

In the event the airgun has malfunctioned, its solenoid valve is shut off by continuously energizing its coil, as explained in U.S. Pat. No. 4,240,518. The master control station 120 addresses the local station 118, where the malfunctioning airgun is located, and instructs that its solenoid valve be shut off. In response to this instruction, the logic circuits 160 transmit a shut-off command signal over a SHUT-OFF bus 176 through the OPTO-ISOLATOR circuit 170 to a valve holding circuit 178. This holding circuit 178 then causes a continuous suitable current to be applied through line 185 to the coil of the solenoid valve, and also causes the pre-charged firing capacitance 174 to be discharged for producing a powerful firing signal. This firing signal causes the plunger in the solenoid valve to move to its closed position, whereupon the reluctance of the magnetic circuit involving this plunger is reduced. Thus, the continuous current will thereafter hold the solenoid valve closed, as will be understood from above-mentioned U.S. Pat. No. 4,240,518.

The reason for the ANTI-FIRING circuit 158 will now be explained. This circuit 158 is energized by a regulated 15 volts D.C. and also by an unregulated 12 volts D.C. on a line 179. As a convenient expedient, this unregulated 12 volts on the line 179 is obtained from the input (first filter stage) of the regulated 5 volts D.C. As long as the switch 132 in the master control station 120 remains closed, the unregulated 12 volts on the line 179 will not unduly drop. When the surveying operations are being discontinued for the day, this switch 132 is opened. Consequently, with the electrical power now shut off, the unregulated 12 volts D.C. will rapidly decay toward zero, while the regulated 15 volts D.C. will momentarily resist significant delay due to the electric energy stored in its filter capacitors. The ANTI-FIRING circuit 158, which acts as a comparator, immediately senses the drop in the unregulated voltage on the line 179 and thereupon immediately shuts off the 15 volts D.C. line 180 previously energizing the OPTO-ISOLATOR circuit 170. Consequently, the OPTO-ISOLATOR circuit 170 is immediately deenergized and cannot transmit any further signals to the GUN FIRING circuit 172 or to the VALVE HOLDING circuit 174. Therefore, all of the airguns remain in their previous state and inadvertent random firing of airguns cannot occur.

In the absence of such an ANTI-FIRING circuit 158, then following shut-off of the switch 132 (FIG. 13), the decaying voltages in the logic circuits 160, which cause a random, erratic or crazy behaviour in the logic, might inadvertently cause firing of the airgun. Consequently, some airguns might be fired; others would not; and a random situation would result. The ANTI-FIRING circuit 158 assures that if the electrical power on the supply line 122 shuts off for any reason, then all airguns remain in their previous state. There is one possible exception, namely, in the case of an airgun whose solenoid valve plunger was being held in the shut-off position by continuous flow of current, as explained above. The shutting off of electrical power on the supply line 122 will allow the valve plunger in any such solenoid valve to return to its normal position as urged by its springs, as will be understood from U.S. Pat. No. 4,240,518. The operator will have been warned about any airgun which is shut off and will have noted the asterisk by that GUN number on the video screen. Therefore, if desired to resume the electrical power, the operator can remotely cause the solenoid valve for that particular GUN to be put back into its continuous shut-off condition.

It is noted that the firing capacitance is 2,000 microFarads charged to 100 volts. This is sufficient voltage and capacitance to give quite a jolt to anybody or anything if inadvertently discharged in any way except in the desired procedure through the solenoid valve coil line 106. Accordingly, there is a capacitor discharge circuit 182 associated with the firing capacitor(s) 174. This discharge circuit 182 includes a power transistor in series with a current-limiting resistor. This discharge circuit 182 is held in the non-conducting state so long as the regulated plus 5 volts exists. Upon decay of this 5-volt regulated electrical supply, as a result of power shut off, this power transistor becomes conductive and drains off the capacitor charge through the current-limiting resistor. Consequently, after the electrical power has been turned off at 132 (FIG. 13), the firing capacitor is discharged through this circuit 182, thus safely reaching essentially zero voltage shortly after shut off of the electric power.

An alternative form of submergible, water-tight junction box 30 (in a cannister-like configuration) is shown in FIGS. 9–12. This latter junction box includes a cylindrical housing 53 of generally tubular configuration with mounting flanges 183 at each end. Insertable axially into this housing 53 is a chassis or support tray 184 having a front end plate 56 and a rear end plate 58 welded onto opposite ends of this support tray 184. These end plates 56 and 58 each has a circular configuration with a peripheral groove containing an O-ring seal or gasket 88 for keeping this container 30 water-tight. Machine screws 84 inserted through a circle of bolt holes in the front cover 56 removably secure the container 30 in closed condition. A bifurcated front hanger 78 straddles a button 28 on the stress member towing cable 14. A rear hanger 79 also hooks over the cable 14. There are front and rear latch members 80 and 81 for preventing the hangers 78 and 79 from becoming unhooked from the stress member 14. The high-pressure air supply line 68 for the nearby airgun is tapped off at 66 from the high-pressure by-pass conduit 64 and includes a manual shut-off valve 67.

Figure 7:
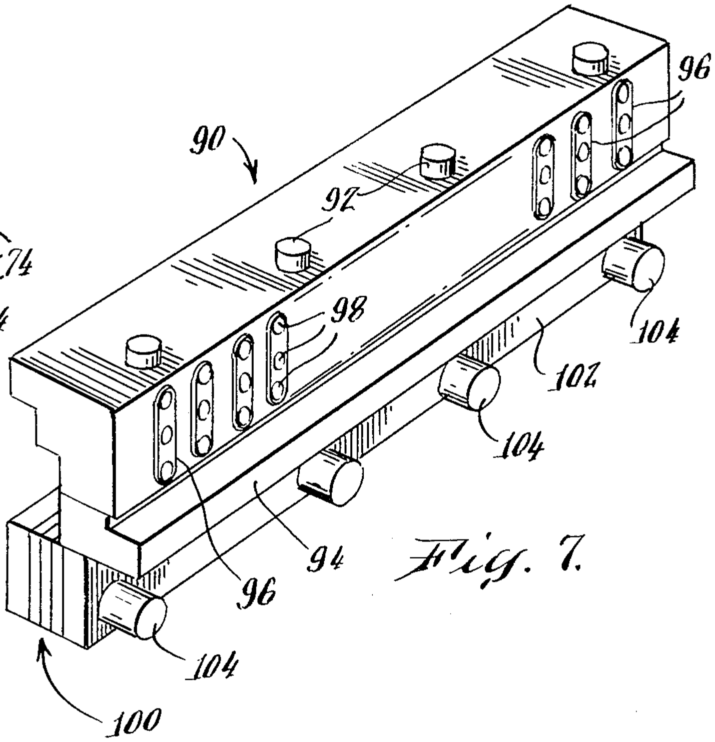
FIG. 7 is a perspective view of the terminal block included in the water-tight junction box of FIGS. 4 through 6.

The tray support 184 carries a disconnectible terminal assembly 90 similar to that as described in connection with FIGS. 6 and 7. The load electronic control station 118 and the firing capacitor(s) 174 are carried by this tray support 184. The terminal assembly 90 serves to connect the local station 118 to the electrical power supply line 122 (FIG. 8) and to the communication bus line 121.

Since other changes and modifications varied to fit particular operating requirements and environments will become understood by those skilled in the art, the invention is not considered limited to the examples chosen for purposes of illustration, and includes all changes and modifications which do not constitute a departure from the true spirit and scope of this invention as claimed in the following claims and reasonable equivalents of the claimed elements.

I claim:

1. The method of simultaneously employing a plurality of marine seismic survey airguns in a towed array for generating seismic impulses in a body of water in which the airguns are modularly interconnected comprising the steps of:
   - using a plurality of submergible water-tight containers having accessible interiors,
   - providing disconnectible electrical terminal connections within the accessible interior of each container,
   - providing a high-pressure air by-pass for each container,
   - interconnecting each by-pass with the next preceding by-pass in the towed array by a disconnectible section of high-pressure hose line,
   - providing an input connection and an output connection on each container for low-pressure air,
   - interconnecting the input connection of each container with the output connection of the next preceding container in the array by a disconnectible section of hose sheath,
   - extending insulated electrical conductors from the terminal connections in one container through the hose sheath section to the terminal connections in the next preceding container in the array,
   - associating each airgun in the array with a predetermined container in the array,
   - connecting the solenoid-controlled valve of each airgun to terminal connections in the associated container,
   - supplying each airgun with high pressure air from the associated by-pass,
   - feeding high pressure air through the high-pressure hose sections and the by-passes in the array for supplying all of the airguns with high-pressure air, and
   - feeding low-pressure air through the hose sheath sections in the submerged towed array at a first low-pressure level exceeding ambient water pressure for enveloping the conductors in all such hose sheath sections with protective air at such pressure exceeding ambient water pressure and for filling all of the containers with protective air at such pressure exceeding ambient water pressure for preventing the entry of ambient water in the event of a leak in any submerged hose sheath section or in any submerged container.

2. The method as claimed in claim 1, comprising the further step of:

connecting an airgun firing sensor transducer associated with each airgun in the array with terminal connections in the associated container for enabling the actual firing of the airgun to be monitored.

3. The method as claimed in claim 1, including the further steps of:

providing a pressure relief valve connected to the output connection of the last container in the array, and setting the opening pressure of said relief valve at a second low-pressure level which is higher than said first low-pressure level, increasing the pressure of the low-pressure air when the array is out of the water to said second low-pressure level to cause said relief valve to open for causing a cooling flow of low-pressure air to flow continuously through all of the hose sheath sections and containers in the array.

4. The method as claimed in claim 1, including the further step of:

creating a continuous cooling flow of low-pressure air through all of the hose sheath sections and containers in the array when the array is out of water.

5. The method as claimed in claim 2, including the further steps of:

providing a pressure relief valve connected to the output connection of the last container in the array, and increasing the pressure of the low-pressure air when the array is out of the water to a pressure level sufficient to cause said relief valve to open for causing a cooling flow of the increased-pressure low-pressure air to flow continuously through all of the hose sheath sections and containers in the array.

6. The method as claimed in claim 2, including the further step of:

creating a continuous cooling flow of low-pressure air through all of the hose sheath sections and containers in the array when the array is out of water 7. The method as claimed in claim 1, including the step of:

monitoring the pressure level of the low-pressure air being supplied to the array.

8. The method as claimed in claim 2, including the steps of:

enveloping the connection to the solenoid-controlled valve of each airgun with protective low-pressure air, and enveloping the connection to the monitor transducer of each airgun with protective low-pressure air.

9. The system of simultaneously employing a plurality of marine seismic survey airguns in an array towed behind a ship in a body of water comprising:

a plurality of submergible water-tight containers having accessible interiors, disconnectible electrical terminal connection means located within the accessible interior of each containers, a high-pressure air by-pass attached to each container, each by-pass in the towed array being connected with the next preceding by-pass in the array by a disconnectible section of high-pressure hose line, an input connection and an output connection on each container for low-pressure air, the input connection of each container in the towed array being connected with the output connection of the next preceding container in the array by a disconnectible section of hose sheath, insulated electrical conductors extending from the terminal connections in one container through the hose sheath section to the terminal connections in the next preceding container in the array and extending from a first container in the array through a first section of said hose sheath to the ship, each airgun in the array being operatively associated with a predetermined container in the array, electrical connections from the solenoid-controlled valve of each airgun to terminal connections in the associated container for enabling the solenoid-controlled valve to be actuated from the ship, a high-pressure air supply connection to each airgun from the associated by-pass, high-pressure air supply means on the ship for feeding high-pressure air from the ship through the high-pressure hose sheath sections and the by-passes in the array for supplying all of the airguns with high-pressure air, and low-pressure air supply means on the ship connected through said first section of said hose sheath to the input connection of the first container in the array for feeding low-pressure air from the ship through the hose sheath sections in the array at a first low pressure exceeding ambient water pressure for enveloping the conductors in all such hose sheath sections with protective air at such first low pressure and for filling all of the containers with protective air at such first low pressure exceeding ambient water pressure, thereby providing pressurized air at said first low pressure, such pressurized air being capable of preventing ambient water from entering into the interiors of the containers and the sections of hose sheath in the event of a leak in any container or section of hose sheath.

10. The system as claimed in claim 9, further comprising:

an airgun firing sensor transducer associated with each airgun in the array electrically connected with terminal connections in the associated container for enabling the actual firing of the airgun to be monitored.

11. The system as claimed in claim 9, further including:

a pressure relief valve connected to the output connection of the last container in the array, said relief valve being set to open at a second low pressure above said first low pressure, and means for increasing the pressure of the low-pressure air when the array is out of the water to said second low pressure above said first low pressure to cause said relief valve to open for causing a cooling flow of the low-pressure air to flow continuously through all of the hose sheath sections and containers in the array.

12. The system as claimed in claim 9, further including:

means for creating a continuous cooling flow of low-pressure air through all of the hose sheath sections and containers in the array when the array is out of water for cooling the interior thereof.

13. The system as claimed in claim 10, further including:

a pressure relief value connected to the output connection of the last container in the array, said relief valve being set to open at a second low pressure which is higher than said forst low pressure, and means for increasing the pressure of the low-pressure air when the array is out of the water to said second low-pressure to cause said relief valve to open for causing a cooling flow of low-pressure air to flow continuously through all of the hose sheath sections and containers in the array.

14. The system as claimed in claim 10, further including:

means for creating a continuous cooling flow of low-pressure air through all of the hose sheath sections and container in the air array when the array is out of water.

15. The system as claimed in claim 9, further including:

means on the survey ship for monitoring the pressure level of the low-pressure air being supplied to the array.

16. The system as claimed in claim 10, further including:

means for enveloping the connection to the solenoid-controlled valve of each airgun with protective low-pressure air, and means for enveloping the connection to the monitor transducer of each airgun with protective low-pressure air.

17. An airgun marine seismic system adapted for towing an array of airguns behind a survey vessel for generating seismic impulses in the water comprising:

a plurality of airguns mounted at spaced positions along towing means adapted to be towed behind the vessel, a high-pressure air line extending along said towing means, a low-pressure air line extending along said towing means, a plurality of electrical conductors extending along said towing means, said conductors extending through said low-pressure air line, a plurality of water-tight containers located at spaced positions along said towing means and each being operatively associated with a predetermined airgun, each of said containers having accessible interiors with disconnectible electrical connection means therein, means for detachably coupling each airgun to said high-pressure air line for supplying high-pressure air to the airguns in the array, means for detachably coupling said low-pressure air line to said containers for supplying low-pressure air to the interiors of said containers at a pressure exceeding ambient water pressure for preventing ambient water from entering said containers, said electrical conductors being removably connected to said disconnectible electric connection means within each container, and means for removably connecting the solenoid-controlled valve of each airgun to the disconnectible electric connection means within the container associated with that airgun.

18. The system set forth in claim 17, in which:

each container has a high-pressure by-pass conduit extending from one end to the other and having an input and an output, said high-pressure line being in sections with one section being detachably coupled to the input and another section being detachably connected to said output, and the airgun operatively associated with the container being connected to said by-pass conduit for supplying high-pressure air to the airgun.

* * * * *